US007003063B2

(12) United States Patent
Mill

(10) Patent No.: US 7,003,063 B2
(45) Date of Patent: Feb. 21, 2006

(54) DETECTING PREAMBLES OF DATA PACKETS

(75) Inventor: Alistair Mill, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 757 days.

(21) Appl. No.: 10/014,292

(22) Filed: Dec. 11, 2001

(65) Prior Publication Data

US 2002/0075974 A1 Jun. 20, 2002

(30) Foreign Application Priority Data

Dec. 20, 2000 (EP) ................................ 00311489

(51) Int. Cl.
*H04L 7/04* (2006.01)

(52) U.S. Cl. ...................... 375/368; 375/365; 375/354

(58) Field of Classification Search ............... 375/316, 375/334–337, 354, 355, 365, 359, 366, 368, 375/371, 343
See application file for complete search history.

(56) References Cited

U.S. PATENT DOCUMENTS

| | | | | |
|---|---|---|---|---|
| 4,984,249 A | | 1/1991 | Long et al. | 375/20 |
| 5,343,497 A | | 8/1994 | Canosi et al. | 375/111 |
| 5,434,905 A | * | 7/1995 | Maeda et al. | 455/464 |
| 5,625,573 A | | 4/1997 | Kim | 364/514 R |
| 5,727,004 A | | 3/1998 | Propp et al. | 371/47.1 |
| 5,907,558 A | | 5/1999 | Watanabe | 370/514 |
| 5,907,587 A | * | 5/1999 | Sokoler | 375/368 |
| 6,111,927 A | * | 8/2000 | Sokoler | 375/365 |
| 6,331,976 B1 | * | 12/2001 | Sriram | 370/350 |
| 6,480,559 B1 | * | 11/2002 | Dabak | 375/368 |
| 2002/0067784 A1 | * | 6/2002 | Bowler | 375/354 |

OTHER PUBLICATIONS

Nielsen et al. “A Preamble Based Diversity Scheme for Dect Using a New Signal Quality Measure,” 47 IEEE Vehicular Technology Conference, Phoenix, US, vol. 3, 2017-2021.

Pieper, T., Examiner. European Search Report Application No. EP 00 31 1489, dated Jun. 29, 2001.

Sanchez-Perez et al. “Robust FM Data Transmission In Multipath Propagation Environments,” Sep. 19, 1999, abstract XP-000922299, pp. 2959-2963.

* cited by examiner

*Primary Examiner*—Chieh M. Fan
*Assistant Examiner*—Jason M. Perilla

(57) ABSTRACT

Fast detection of a selected portion of a data packet (e.g. the preamble of a Bluetooth data packet) is accomplished by defining a reference signal waveform conforming to an expected waveform representing a signal modulated in accordance with the selected portion of a data packet. A waveform representing a received data signal containing a data packet with the selected portion is derived, and the reference signal waveform is correlated with this derived waveform to produce a correlation result. This correlation result is used to identify the selected portion in the received data signal.

7 Claims, 3 Drawing Sheets

DETECTING PREAMBLES OF DATA PACKETS

TECHNICAL FIELD

This invention relates to the detection of preambles of data packets, for example in data communications systems.

BACKGROUND ART

Many communications systems transmit streams of data by dividing a data stream into successive portions and assembling each portion together with, for example, addressing information and error detection and correction information to produce a data packet (sometimes alternatively known as a cell or frame). Each data packet is then transmitted independently by modulating an electrical or electromagnetic (radio or optical) signal in accordance with the packet's contents and transmitting the signal via the relevant communications medium to a receiver. Functions such as intermediate storage, error detection and retransmission are performed at the packet level. The format of data within a packet is typically defined in terms of successive functional groups of symbols (such as bits in a binary digital system), where the interval between symbols is defined in terms of the frequency of a clock signal which controls the timing of electrical or electromagnetic signal transitions representing the data symbols. Boundaries between successive packets in a symbol stream may be defined in various ways, such as by providing a fixed pattern of symbols to identify the start or end of a packet.

In asynchronous communications systems, that is systems in which no master clock signal is used to co-ordinate the operation of system nodes, receiving nodes must be able to recognise and synchronise with the signal transitions which represent the data symbols, and to identify the boundaries between successive data packets. Such systems particularly include (but are not limited to) wireless systems in which data is transmitted by modulation of electromagnetic signals, such as r.f. or optical signals. Examples include the Digital Enhanced Cordless Telecommunications (DECT) standard defined by the European Telecommunications Standards Institute (ETSI) in EN 300 444 and associated documents, and the Bluetooth short-range wireless standard defined by the Bluetooth Special Interest Group in the *Specification of the Bluetooth System,* v1.0 B, December 1999 (available via the URL http://www.bluetooth.com).

It is also desirable to ensure that the numbers of each different kind of symbol (for example binary 0's and 1's) in the transmitted signal are approximately equal, to avoid problems of long-term d.c. offset in electrical circuits carrying the signal.

The need for synchronisation, boundary recognition and d.c. compensation is typically met by commencing each packet with blocks of data symbols with predetermined values. These blocks are known in the Bluetooth standard, for example, as preambles and sync words. The Bluetooth preamble has a value of either 1010 or 0101 (binary), chosen to facilitate d.c. compensation in accordance with whether the least significant bit (LSB) of the sync word which immediately follows the preamble is 1 or 0 respectively. The Bluetooth sync word is a 64-bit word derived in a manner which ensures large Hamming distance between different sync words and provides good auto-correlation properties of the sync word to assist the timing synchronisation process. The sync word is followed by a 4-bit trailer which has a value of 1010 or 0101, depending on whether the most significant bit (MSB) of the sync word is 0 or 1 respectively, to provide for extended d.c. compensation.

The Bluetooth wireless signal is produced by applying a binary frequency-shift keyed (FSK) 0.5BT Gaussian-filtered baseband modulation to a carrier signal in the 2.4 GHz ISM band, such that a binary one is represented by a positive frequency deviation and a binary zero by a negative frequency deviation.

In certain circumstances it is necessary to be able to determine precisely the position of the preamble's LSB, also known as the bit p0, within a Bluetooth signal. For example, the RF Test Specification for conformance testing of Bluetooth-enabled devices defines various tests which depend upon knowledge of the position of the bit p0, to identify the start of signal bursts to be measured or the position of payload data bits within the signal.

In known systems with similar signal formats (such as DECT) this may be accomplished in one of two ways:

- Match the bit pattern of the sync word. This is feasible for DECT signals, which have only two possible sync word patterns, but infeasible for Bluetooth signals for which the sync word can be any 64-bit word
- Manually adjust a trigger delay setting until a visual display of the Bluetooth signal is aligned with a marker indicating the desired position of the p0 bit. This is a difficult and time-consuming process which is prone to error, and therefore especially unsuitable in the context of testing of equipment on a production line where speed and accuracy of testing are of great significance.

It is an object of this invention to facilitate the precise and rapid detection of a selected portion of a data packet, such as the preamble (including the bit p0) of a Bluetooth data packet.

DISCLOSURE OF INVENTION

According to one aspect of this invention there is provided a method of detecting a selected portion of a data packet, comprising the steps of:

defining a reference signal waveform conforming to an expected waveform representing a signal modulated in accordance with a selected portion of a data packet;

receiving a data signal containing a data packet with said selected portion;

deriving a waveform representing said data signal;

correlating said reference signal waveform with said waveform representing said data signal to produce a correlation result; and identifying said selected portion in said data signal in accordance with said correlation result.

In the context of testing a Bluetooth-enabled device, the invention searches the received data stream for a known pattern of binary 1010 which is embedded within the preamble (or the preamble plus LSB of the sync word if the preamble itself is 0101). More particularly, the invention exploits the fact that a frequency-discriminated 1010 preamble of a Bluetooth signal with its Gaussian-filtered baseband modulation is very similar in waveform to a sinusoidal (specifically cosine) wave. Thus correlation of a frequency-discriminated Bluetooth signal with a cosine wave enables rapid detection of 1010 sequences in the signal. Simple additional processing provides verification that a detected 1010 sequence is indeed the preamble, and confirmation of whether the preamble is actually 1010 or 0101, so that the precise location of the bit p0 can be determined. The reference cosine waveform is simple to generate, and as the length of the comparison sequence (4 bits) is short, relatively little processing power is required for a correlation to provide a result quickly and entirely automatically.

BRIEF DESCRIPTION OF DRAWINGS

A method and apparatus in accordance with this invention, for detecting the location of the bit p0 in a Bluetooth modulated signal, will now be described, by way of example, with reference to the accompanying drawings, in which.

BEST MODE FOR CARRYING OUT THE INVENTION, & INDUSTRIAL APPLICABILITY

Figure 1:
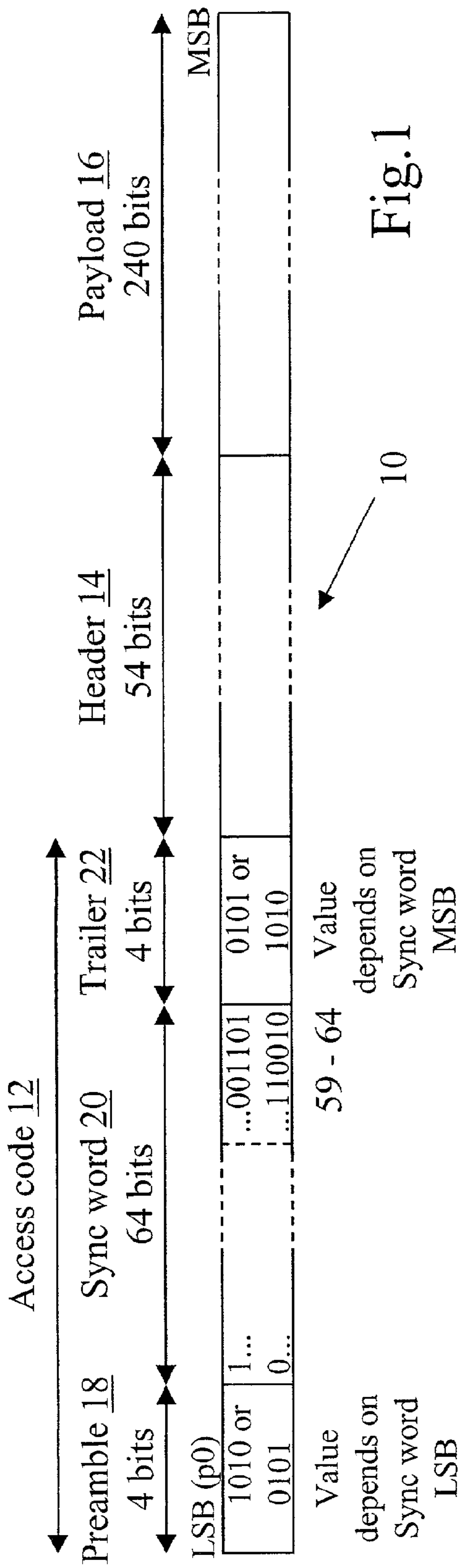
FIG. 1 shows the structure of a Bluetooth DH1 (Data—High rate) data packet.

FIG. 1 shows, by way of example, one kind of Bluetooth data packet 10 (a DH1 packet). Referring to FIG. 1, the packet 10 comprises: an access code 12, comprising 72 bits; a header 14, comprising 54 bits; and a payload 16, comprising 240 bits (an 8-bit header, 27 8-bit bytes, and a 16-bit CRC code). In other kinds of Bluetooth packets the payload may have a different number of bits, between 0 and 2745 depending on the packet.

The access code 12 itself comprises three portions: a preamble 18, comprising 4 bits with a value of either 1010 or 0101 as described earlier, and the first bit (LSB) of which is the bit p0; a sync word 20, comprising 64 bits, derived from the unique device address of a Bluetooth device; and a trailer 22, comprising 4 bits with a value of either 0101 or 1010 as described earlier. In other Bluetooth packet types, comprising only the access code, the trailer is omitted.

The derivation of the sync word is such that its six most significant bits (MSBs), i.e. the $59^{th}$ to $64^{th}$ bits, have a value of either 001101 or 110010, depending on whether the $58^{th}$ bit (derived from the device address mentioned above) is 0 or 1 respectively.

Figure 2A:
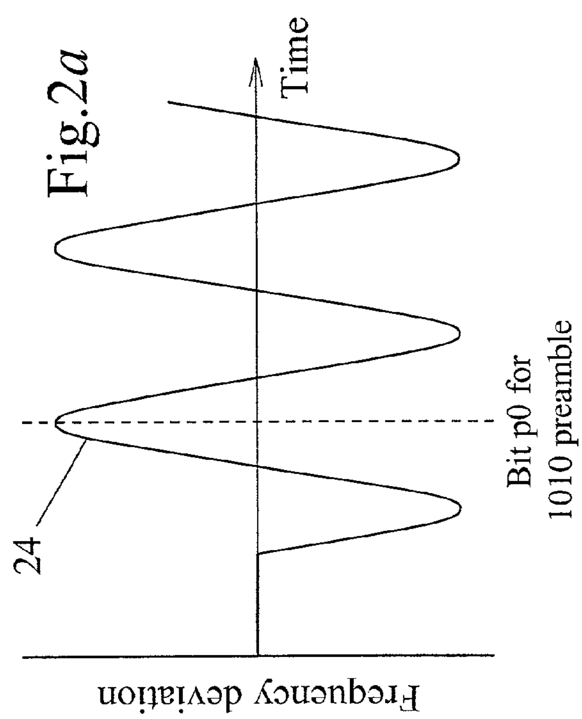
FIGS. 2*a* and 2*b* show the position of the bit p0 in a Bluetooth modulated signal for each possible value of preamble.
Figure 2B:
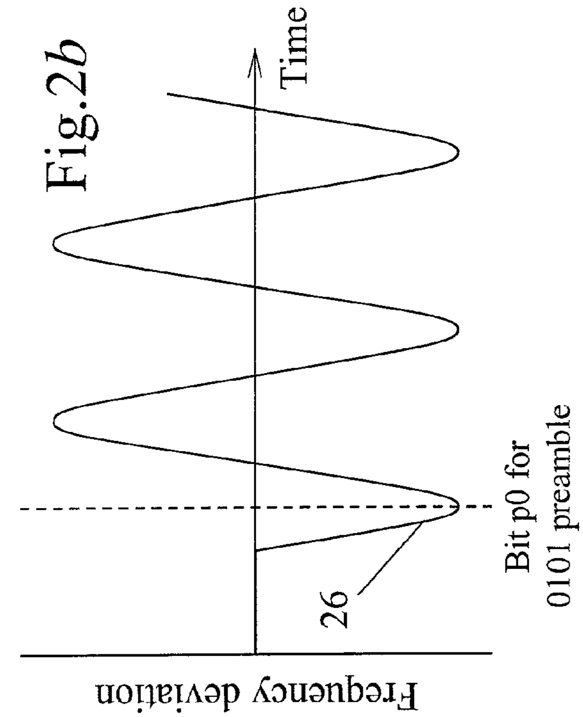

A Bluetooth signal comprises a carrier wave which is binary FSK modulated with a Gaussian-filtered baseband signal. As a result, and as shown in FIGS. 2*a* and 2*b*, the waveform of a frequency-discriminated version of the modulated carrier wave closely resembles a simple sinusoidal wave, with the positive and negative peaks of the sinusoid representing maximum positive and negative frequency deviation, and binary one and zero, respectively. In the case of a preamble with a value 1010 the temporal location of the bit p0 corresponds to the first positive peak 24 of the sinusoid, as shown in FIG. 2*a*. For a preamble with a value of 0101, the bit p0 occurs at the first negative peak 26 of the sinusoid, as shown in FIG. 2*b*.

Figure 3:
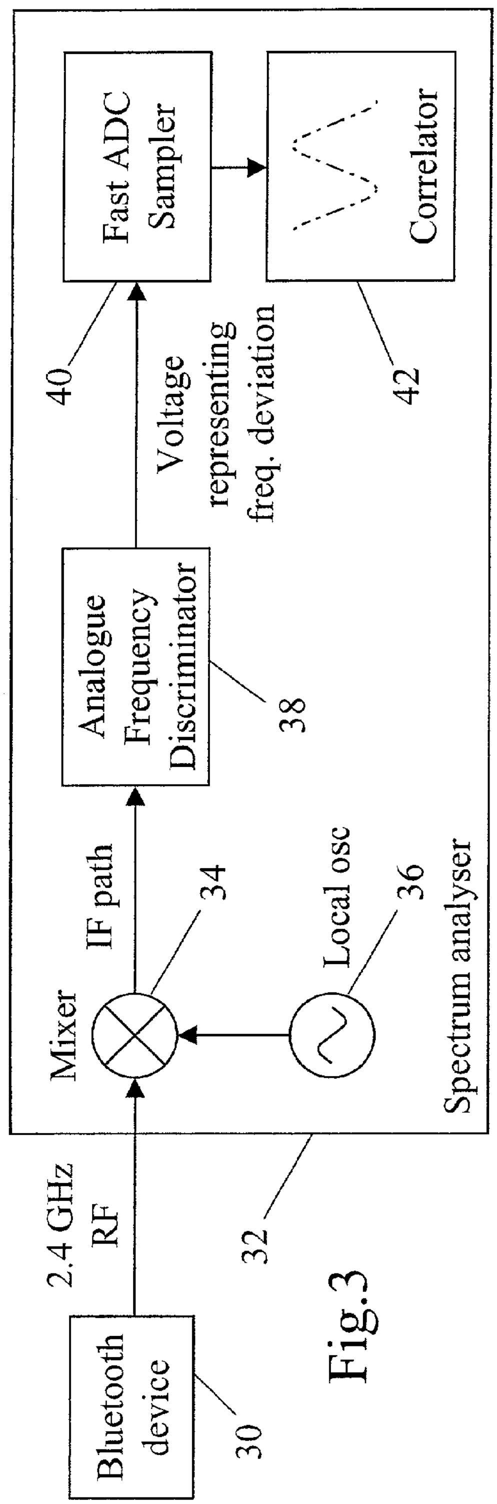
FIG. 3 is a schematic block diagram of apparatus for implementing the invention.

FIG. 3 shows apparatus for detecting the preamble of a Bluetooth data packet. Referring to FIG. 3, the 2.4 GHz RF signal from a Bluetooth device 30 under test is supplied to an input of a spectrum analyser 32 operating in zero span (fixed tuned) mode, where the signal is fed to a mixer 34 which also receives a signal from a local oscillator 36. The frequency of this oscillator is offset relative to the Bluetooth RF signal so that the mixer generates an FSK modulated heterodyne signal corresponding to the RF signal, but at a chosen lower intermediate frequency (IF). This IF signal is passed to an analogue frequency discriminator 38 which generates an output voltage representative of the deviation of the FSK modulated signal relative to its centre frequency. The frequency deviation voltage is sampled and digitised in a fast analogue-to-digital converter (ADC) 40, and the digitised samples are supplied to a correlator 42.

Figure 4:
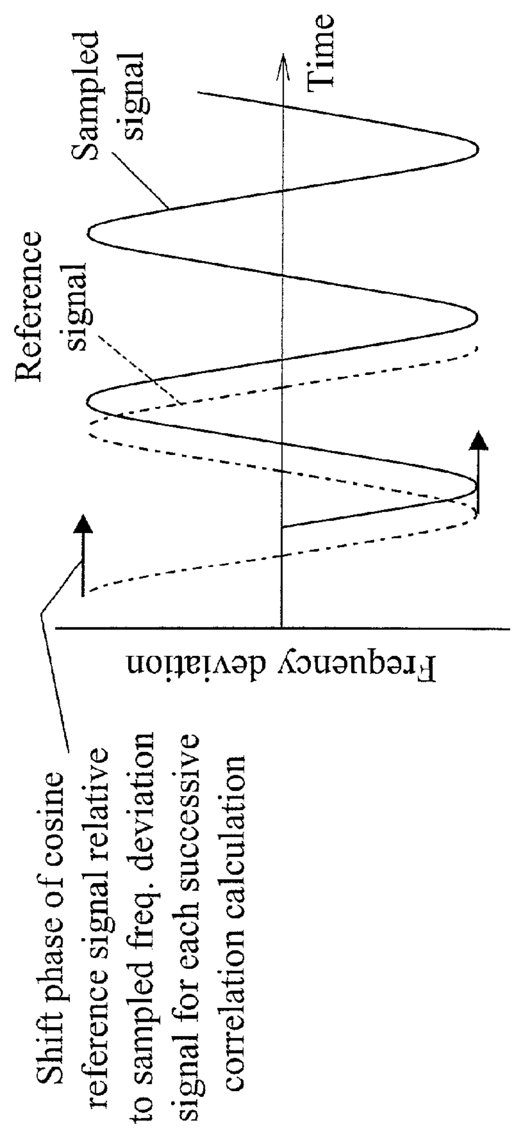
FIG. 4 illustrates the process of correlating a waveform derived from a Bluetooth signal with a reference cosine waveform.

The correlator 42 may be implemented using a digital signal processor (DSP) or other more general-purpose processor, executing a set of software program instructions to control its operation. The principal function of the correlator is to compare the digitised frequency deviation signal from the ADC 40 with a reference digitised signal representing 540 degrees (1½ cycles) of a cosine waveform, shown in dashed line in FIG. 4. The frequency and amplitude of this reference waveform are chosen to correspond to the sample rate and expected frequency deviation of a Bluetooth modulated 1010 signal. A suitable frequency deviation figure is 138.6 kHz, derived as follows: the modulation index of a Bluetooth signal can be between 0.28 and 0.35, so assume a mid-point value of 0.315; the frequency of modulation is 500 kHz (2 symbols per cycle providing 1 Mbit/s; so the maximum frequency deviation=modulation index*frequency of modulation=0.315*500=157.5 kHz. The 0.5BT Gaussian filtering results in a maximum deviation for a repeating 1010 data pattern of approximately 88% of the maximum deviation for a repeating 11110000 data pattern. Accordingly the expected frequency deviation is 157.5*0.88=138.6 kHz. If desired the frequency and amplitude of the reference waveform can be made adjustable.

The correlation is performed multiple times as the relative phase of the frequency deviation signal and the reference waveform are varied through a predetermined range, and the correlation result is inspected to identify a phase relationship for which a close fit exists between the reference waveform and a portion of the frequency deviation signal of similar duration. Thereafter checks are made to confirm that the selected portion of the frequency deviation signal does indeed correspond to the packet preamble, and to discriminate between the two possible preamble values.

Figure 5:
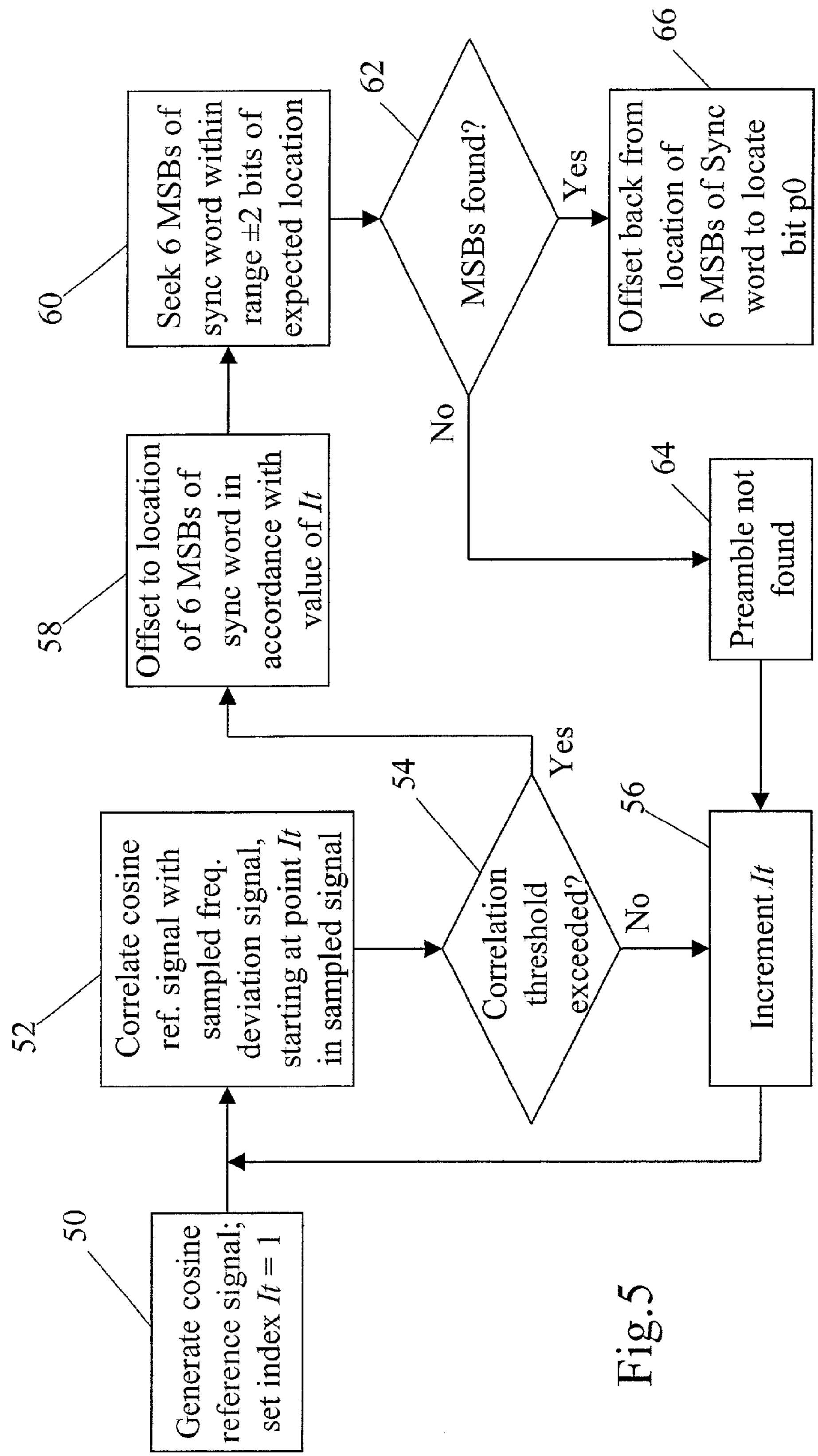
FIG. 5 is a flow chart showing a procedure for performing correlation and subsequent processing to confirm the position of the bit p0.

The steps performed by the correlator 42 are shown in FIG. 5. Referring to FIG. 5, at step 50 the cosine reference signal is generated and an index It, which is used to control the relative phasing of the two correlated signals, is set to 1. At step 52 a value is derived for the correlation between the reference and frequency deviation signals. The value of each successive sample of the reference signal is multiplied with the value of a corresponding sample of the frequency deviation signal, starting at the sample identified by the index It. The products of all the multiplications for the set of samples making up the reference signal are summed to produce the required correlation value.

At step 54 the correlation value is compared with a predetermined correlation threshold selected to indicate when a good match between the correlated signals has occurred which is indicative that the preamble has been located. A threshold value of 0.37, determined empirically, has been found to provide satisfactory results. If the correlation value does not exceed the threshold, the procedure continues to step 56, where the index It is incremented by 1. Thereafter the procedure returns to step 52 to repeat the derivation of the correlation value for the new relative phase relationship of the correlated signals.

When the test at step 54 indicates that the correlation value exceeds the threshold, the procedure advances to step 58, where the identity and value of the preamble is confirmed. These steps are necessary because there is a possibility of the reference signal correlating strongly with a portion of the packet payload, for example, which by chance has a value of 1010 or 0101. This strong correlation would give a spurious indication of the location of the preamble. In addition, the cosine reference signal by design cannot discriminate between the two possible preamble values (it may correlate either with the preamble proper, or with the three MSBs of the preamble together with the LSB of the sync word). However, such discrimination is necessary to ensure precise location of the bit p0, because of the slight difference in timing of this bit for the two different preambles as shown in FIGS. 2*a* and 2*b*. These problems are resolved by inspecting another portion of the access code 12 with known, unambiguous properties, namely the final six MSBs of the sync word 20 (see FIG. 1). These six MSBs have only two possible values, which are mutually distinct irrespective of starting position for a comparison.

Accordingly at step 58 the procedure derives the offset to the expected location in the frequency deviation signal of these six MSBs, on the basis of an initial assumption that the detected preamble has a value of 1010 to determine a tentative location for the bit p0. Thus the required six MSBs should be located starting at 62 frequency deviation peaks after the positive peak tentatively determined as being the bit p0 in accordance with the value of the index It. At step 60 the procedure inspects the value of a block of six successive bits as represented by the frequency deviation signal, starting at a point two bits before the location identified at step 58. This block of six bits is compared with the two expected values for the six MSBs of the sync word, that is 001101 and 110010 (see FIG. 1). If the selected block of six bits does not match either value, then the starting point for selecting the six bits is moved one bit in the more significant direction, and the comparison is repeated. This process is repeated until either a match with one of the expected values for the six MSBs is found, or the search has extended to a starting point two bits after the location identified at step 58.

If it is established at step 62 that neither of the expected values for the block of six MSBs has been found, then it is determined at step 64 that the preamble has not in fact been located, and the procedure returns to step 56 to increment the index It and continue the correlation process.

If step 62 indicates that one of the MSB blocks has been found, the procedure advances to step 66. As well as verifying that a valid preamble has been detected, the starting point identified at step 60 for the six MSBs of the sync word enables the location of the bit p0 to be determined precisely. More specifically, the location of the bit p0 can be determined as being offset 62 frequency deviation peaks before the actual starting point for this block of six MSBs, irrespective of the value of the block.

Variations of the technique described above are possible. For example, the frequency deviation signal may be obtained by sampling the Bluetooth signal in the time domain (possibly after frequency down-conversion), and using a digital signal processor to derive the frequency deviation signal by differentiating the phase of the complex sample points with respect to time (frequency is the rate of change of phase).

What is claimed is:

1. A method of detecting a preamble of a data signal formatted to conform to a wireless communications standard, comprising the steps of:

defining a reference cosine signal waveform;

receiving a data signal containing said preamble;

deriving a waveform representing said data signal containing said preamble;

correlating said reference cosine signal waveform with said waveform representing said data signal containing said preamble to produce a correlation result;

identifying said preamble in said data signal in accordance with said correlation result; and comparing a part of the data signal other than said preamble with a predetermined criterion, and confirming identification of said preamble in accordance with a result of such comparison.

2. The method of claim 1, wherein said waveform representing said data signal is derived to represent a modulation characteristic of said data signal in accordance with data in said data packet.

3. The method of claim 2, wherein said data signal is a frequency-shift keyed signal and said waveform representing said data signal is derived to represent frequency deviation of said data signal as a function of time.

4. The method of claim 1, wherein said wireless communications standard is a Bluetooth wireless communications standard.

5. The method of claim 1, wherein the part of the data signal other than said preamble comprises a portion of a sync word in the data signal.

6. The method of claim 5, wherein the part of the data signal other than said preamble comprises six most significant bits of the sync word.

7. An apparatus for detecting a preamble of a data signal formatted to conform to a wireless communications standard, comprising:

a waveform generator for defining a reference cosine signal waveform;

a receiver for receiving a data signal containing said preamble, and for deriving a waveform representing said data signal containing said preamble; and a correlator for correlating said reference cosine signal waveform with said waveform representing said data signal containing said preamble to produce a correlation result, identifying said preamble in said data signal in accordance with said correlation result, comparing a part of the data signal other than said preamble with a predetermined criterion, and confirming identification of said preamble in accordance with a result of such comparison.

* * * * *